United States Patent [19]

Graham et al.

[11] Patent Number: 4,665,488

[45] Date of Patent: May 12, 1987

[54] SYNCHRONIZING WIPER CONTROL

[75] Inventors: Donald E. Graham, Centerville; James J. Kowalik, West Carrollton, both of Ohio; Alexander Kade, Detroit, Mich.

[73] Assignee: General Motors Corporation, Detroit, Mich.

[21] Appl. No.: 678,896

[22] Filed: Dec. 6, 1984

[51] Int. Cl.$^4$ .......................... B60S 1/08; G05D 13/02
[52] U.S. Cl. ..................................... 364/424; 318/444; 318/DIG. 2; 15/250.17; 15/250.12; 15/250.13
[58] Field of Search ................ 364/424; 318/443–446, 318/DIG. 2, 466, 467, 468, 264, 266, 282, 283; 15/250.12–250.14, 250.16, 250.17

[56] References Cited

U.S. PATENT DOCUMENTS

| | | | |
|---|---|---|---|
| 3,226,755 | 1/1966 | Fox et al. | 15/250.16 |
| 3,483,459 | 12/1969 | Kearns | 15/250.15 X |
| 3,721,878 | 6/1972 | Gumbert | 318/443 |
| 4,000,449 | 12/1976 | Gripp | 318/72 |
| 4,405,887 | 9/1983 | Tamura et al. | 318/443 |
| 4,431,954 | 2/1984 | Carpenter et al. | 318/443 |
| 4,585,980 | 4/1986 | Gille et al. | 318/444 |

FOREIGN PATENT DOCUMENTS

1522822 8/1978 United Kingdom .
1561394 2/1980 United Kingdom .

Primary Examiner—Felix D. Gruber
Assistant Examiner—Thomas G. Black
Attorney, Agent, or Firm—Robert M. Sigler

[57] ABSTRACT

A control for separately driven, potentially interfering wiper blades includes position sensors for each wiper blade and a memory which stores, for each pattern, numbers representing inner and outer wipe positions with acceleration, constant velocity and deceleration regions therebetween and a command velocity for the constant velocity regions. The memory further stores numbers defining a zone of potential blade interference and, for each position of each blade within this zone, a non-interference zone for the other blade. The control further includes closed loop velocity control apparatus responsive to the signals from the position sensors and the command velocity to maintain the command velocity in the constant velocity region, accelerate to the command velocity in the acceleration region and decelerate from the command velocity in the deceleration region. The control also synchronizes the wiper blades at each of the inner and outer wipe positions and includes apparatus responsive to signals from the position sensors indicating that both of the blades are within the zone of potential blade interference to derive from the memory, for the position of the blade in advance in the direction of common blade movement, the non-interference zone for the other blade and prevent the other blade from leaving this zone.

3 Claims, 9 Drawing Figures

SYNCHRONIZING WIPER CONTROL

BACKGROUND OF THE INVENTION

This invention relates to a control for a motor vehicle window wiper system and particularly to such a control for a system having a pair of potentially interfering wiper blades driven by separate electric motors. In such a system, unlike the more traditional single motor system with mechanical interlocking drive means, there is need for apparatus to ensure that the wiper blades stay in synchronized wiping patterns and do not interfere with each other, even if one of the blades is stopped or otherwise strays far out of synchronization.

Prior art systems have been described which synchronize a pair of separately driven wiper blades on a vehicle window by sensing the arrival of each wiper blade at a predetermined point in its wiping pattern and preventing the first wiper blade to reach that point from proceding until the other wiper blade has also reached its corresponding point. Such points have been suggested as one or both ends of the wipe cycle at the points of reversal of blade motion. It has also been suggested that more points might be used throughout the cycle.

The suggestions of the prior art have been good, but they can be improved. For example, synchronization only at end points might cause noticeable pauses in the wipe cycle of one wiper blade if the other is driven at an appreciably slower rate or through a significantly longer path. Addition of more numerous check points might also cause annoyingly uneven wiper blade movement. Finally, stoppage of one blade will not necessarily stop the other blade, with the resulting possibility of blade interference.

SUMMARY OF THE INVENTION

The invention thus not only synchronizes the blades of a wiper system at predetermined synchronization points but also controls the speed of each blade according to a predetermined program to reduce uneven blade movement and, in addition, continually monitors wiper blade position to prevent blade interference.

The invention comprises a control for a vehicle window wiper system having a pair of reversible electric motors effective to drive wiper blades through repeating, synchronized overlapping patterns across a vehicle window and including a position sensor for each wiper blade effective to generate a signal representing the angular position of the blade, first memory means defining, for each pattern, inner and outer wipe positions with acceleration, constant velocity and deceleration regions therebetween and further defining a command velocity for the constant velocity regions, second memory means defining a zone of potential blade interference and, for each position of each blade within this zone, a non-interference zone for the other blade, velocity control means responsive to the signals from the position sensors and effective to derive the velocity of the blades therefrom and the command velocity from the first memory means and deliver electric power to the motors in closed loop control so as to maintain the command velocity in the constant velocity region, accelerate to the command velocity in the acceleration region and decelerate from the command velocity in the deceleration region, synchronization means effective to synchronize the wiper blades at each of the inner and outer wipe positions by stopping each blade as it reaches the position and starting both together in the reverse direction and means responsive to signals from the position sensors indicating that both of the blades are within the zone of potential blade interference to derive from the second memory means, for the position of the blade in advance in the direction of common blade movement, the non-interference zone for the other blade and prevent the other blade from leaving this zone, whereby wiper operation is coordinated with controlled velocity, synchronized wipes and prevention of blade interference.

This system thus controls two separately driven wipers smoothly without interference. If one wiper is stopped, the system senses the fact and stops the other wiper short of the position of the stopped wiper. Further details and advantages of this invention will be apparent from the accompanying drawings and following description of a preferred embodiment.

DESCRIPTION OF THE PREFERRED EMBODIMENT

Figure 1:
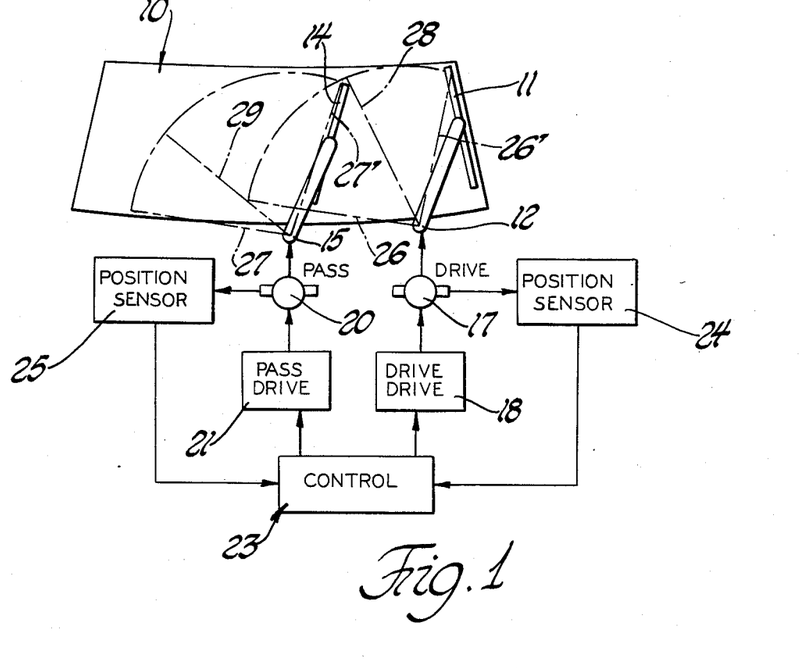
FIG. 1 is a schematic and block diagram of vehicle window wiper system according to this invention.

Referring to FIG. 1, a motor vehicle window such as windshield 10 incudes a driver side wiper blade or DRIV blade 11 pivoted at point 12 below the driver side of the window and a passenger side wiper blade or PASS blade 14 pivoted at point 15 below the approximate center of the window. Blade 11 is powered by DRIV motor 17, a reversible DC motor which receives electric power for actuation in either direction selectably from DRIV drive 18. Blade 14 is similarly driven by PASS motor 20, which receives electric power from PASS drive 21. A control 23 controls the actuation of blades 11, 14 through drives 18, 21. Blades 11, 14 are driven by their respective motors 17, 20 through reduction gear mechanisms and have associated respective rotational position sensors 24, 25. Each of position sensors 24, 25 follows the rotational position of its respective blade and generates an analog voltage signal thereof for delivery to control 23. Potentiometers connected across a stable electric voltage supply are preferred embodiments for position sensors 24, 25, although the invention is not to be limited to such specific sensors.

FIG. 1 indicates the wiper pattern for each blade on window 10 with the blades shown in their extreme outerwipe positions. The innerwipe positions of blades 11, 14 are marked as lines 26, 27. In addition, lines 28, 29 mark, for blades 11, 14, respectively, the limit of movement through which that blade cannot interfere with the other blade. Outerwipe positions are marked in FIGS. 7a-7c by numerals 26', 27', respectively.

Figure 2:
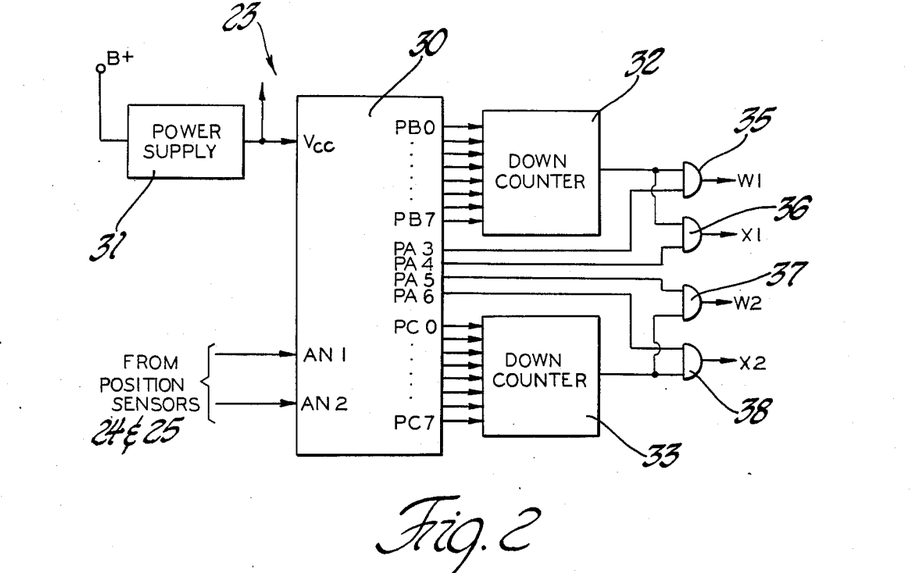
FIG. 2 is a schematic diagram of a portion of the control of the system of FIG. 1.

FIG. 2 shows an example of control 23, which is built around a digital computer 30. A recommended choice for computer 30, although not the only choice, is a Motorola MC6805R2 (R) one-chip microcomputer. This device includes on-chip CPU, RAM, ROM, clock, timer, A-D converter, digital input and output lines and analog input lines. Computer 30 has a Vcc input connected to a power supply 31, analog inputs AN1, AN2 connected to the outputs of position sensors 24, 25, respectively, digital outputs PB0—PB7 connected to a down counter 32 and digital outputs PC0—PC7 connected to a down counter 33. Other pins of computer 30 may be connected in the normal manner familiar to those designing circuits for the MC6805R2 or as described in the Motorola Microprocessors Data Manual, available from Motorola Inc., Austin, Texas 78721.

Down counters 32, 33 may be of the type identified as CD40103. The output of down counter 32 is connected to one input each of AND gates 35, 36. AND gate 35 has another input connected to digital output PA3 of computer 30 and an output labelled W1. AND gate 36 has another input connected to digital output PA4 of computer 30 and an output labelled X1. These outputs are connected to similarly labelled inputs of the motor drive circuit shown in FIG. 6, to be described at a later point in this specification. Likewise, the output of down counter 33 is connected to one input each of AND gates 37, 38. AND gate 37 has another input from digital output PA5 of computer 30 and an output labelled W2. AND gate 38 has another input from digital output PA6 of computer 30 and an output labelled X2. Outputs W2, X2 are connected to inputs of another motor drive circuit identical to that shown in FIG. 6. The connections between computer 30, down counters 32, 33 and AND gates 35-38 are somewhat simplified for purposes of description, since the exact circuitry is not important to this invention, is well known to those who work designing circuits with those or similar devices and is subject to change with the exact devices chosen.

Figure 6:
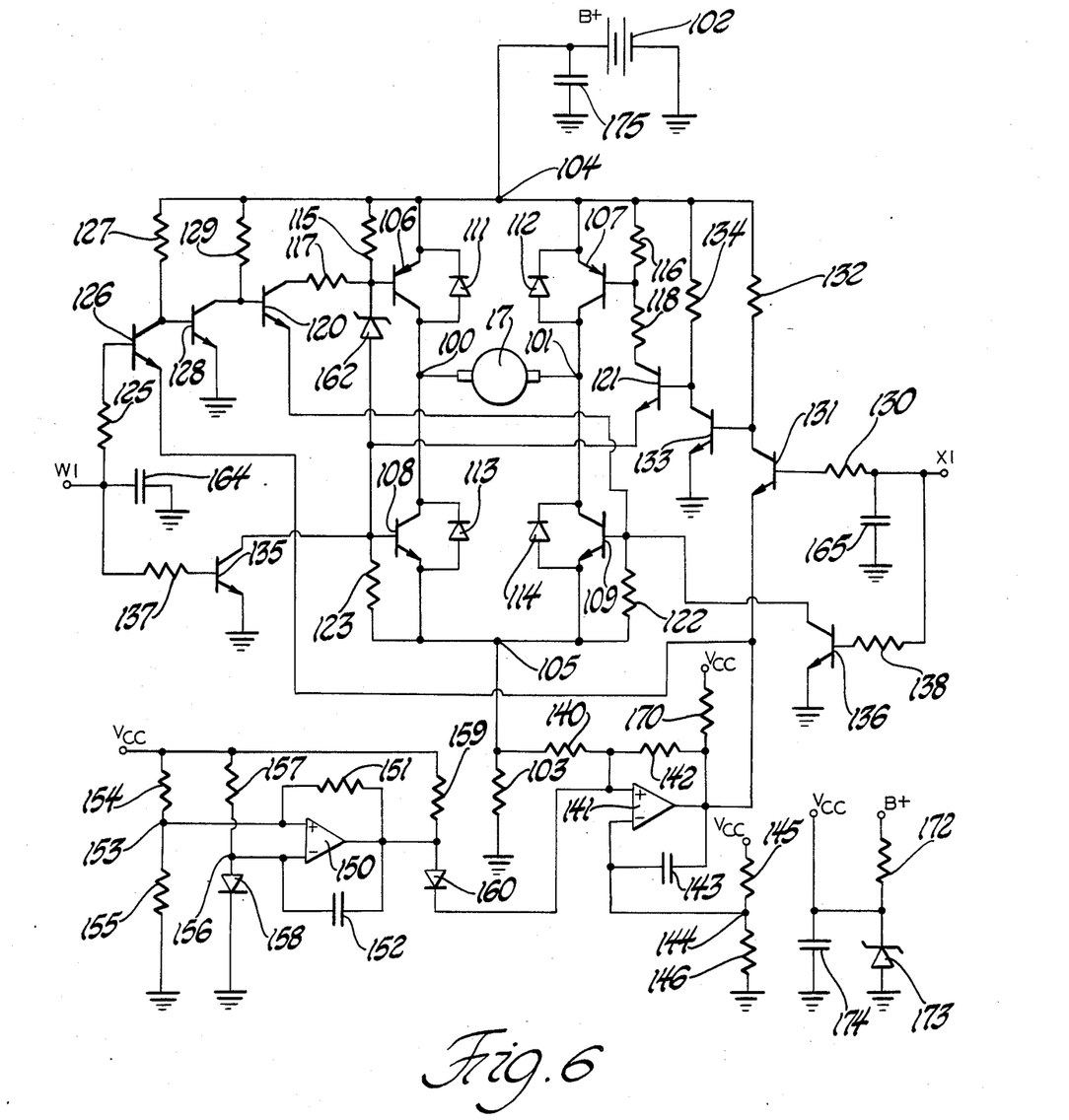
FIG. 6 is a circuit diagram of an electric motor control for use in the system described in the preceding Figures.

In a brief description, the motor control circuit of FIG. 6 provides for selectable actuation of a DC motor in either direction, an off or coast mode and a dynamic brake mode, depending on the four possible states of the two AND gate outputs W1, X1 (W2, X2). This embodiment of this invention uses three of these modes: the two direction actuation modes selected by only W1 high and only X1 high as well as the dynamic brake mode selected by both W1 and X1 high. A more detailed description of the operation of the circuit of FIG. 6 will be given at the end of this specification.

Figure 3:
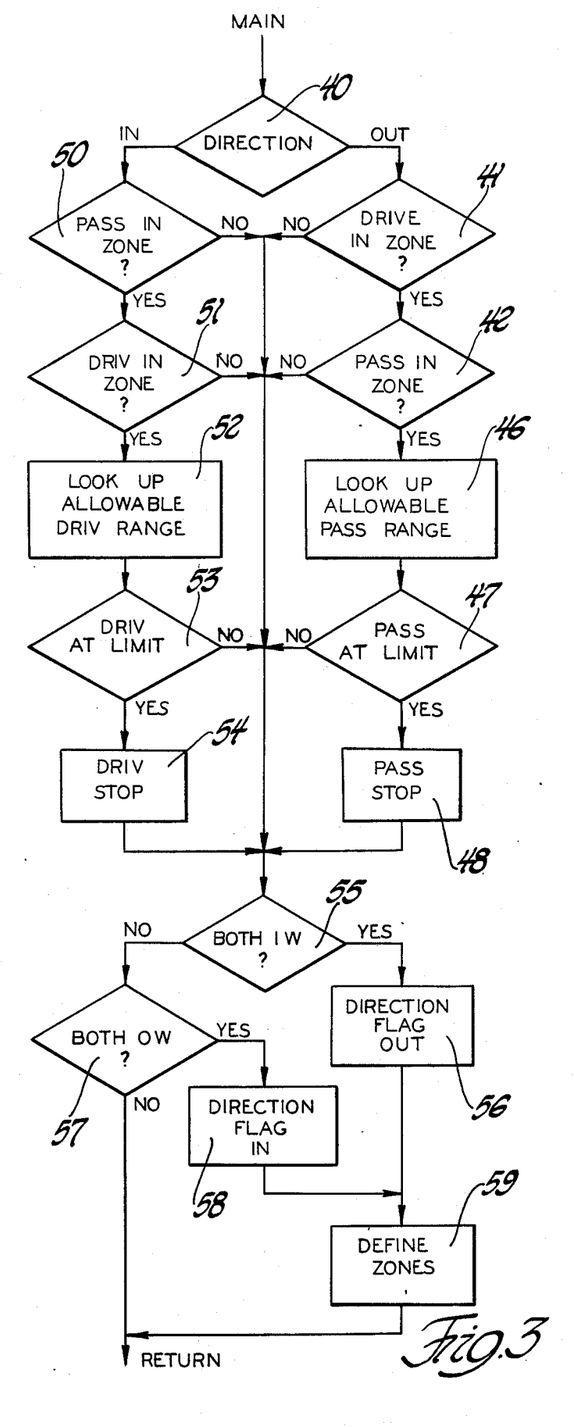
FIGS. 3-5 are flow diagrams describing the operation of the system shown in FIGS. 1—2.
Figure 4:
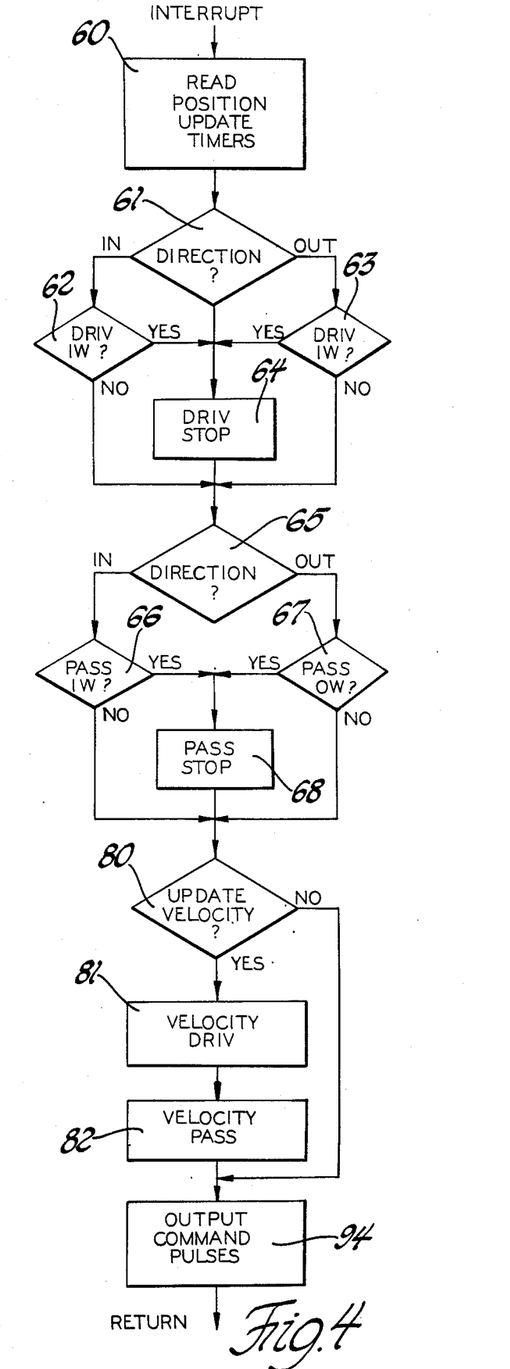
Figure 5:
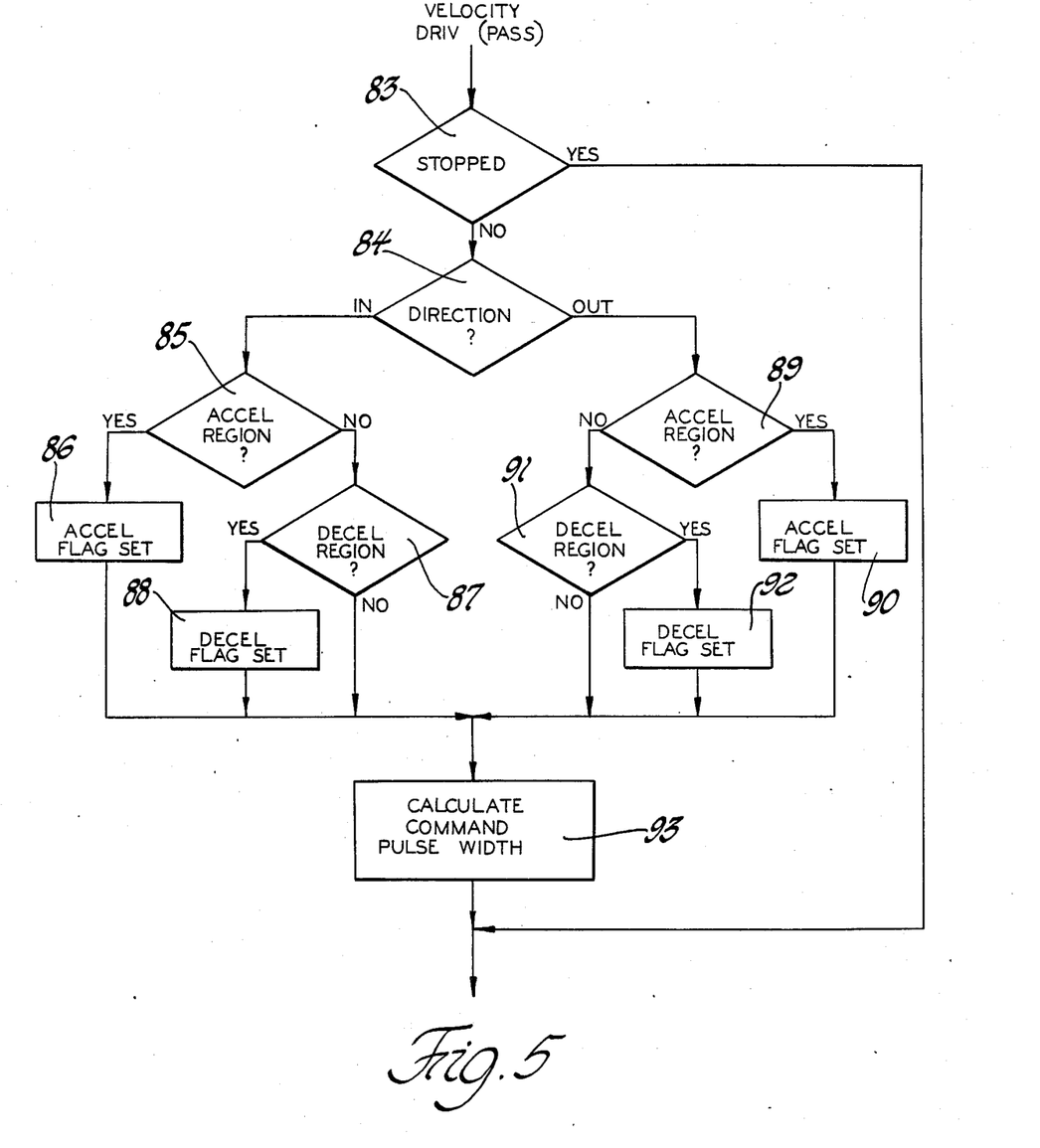
Figure 7A:
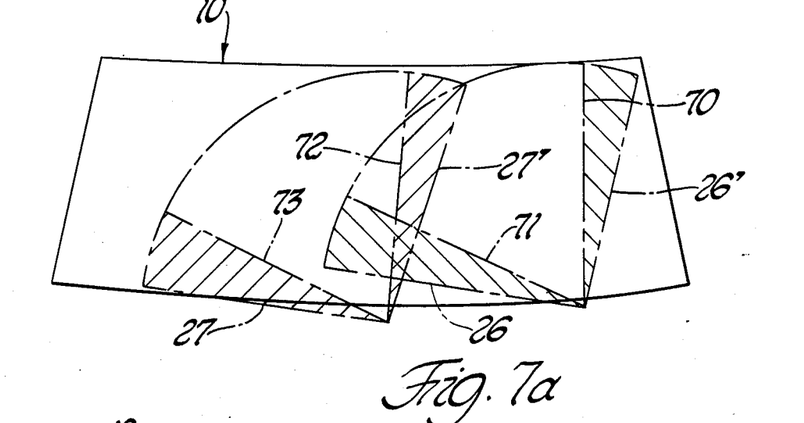
FIGS. 7a-7c are schematic diagrams describing certain features of the wiper blade patterns in the system of the preceding Figures.
Figure 7B:
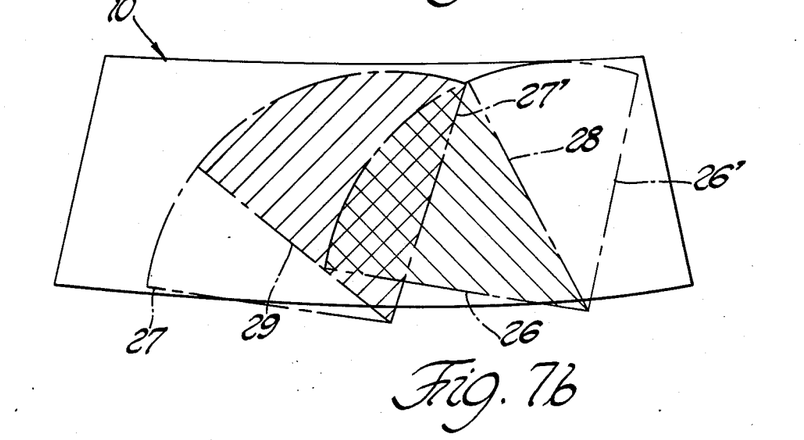
Figure 7C:
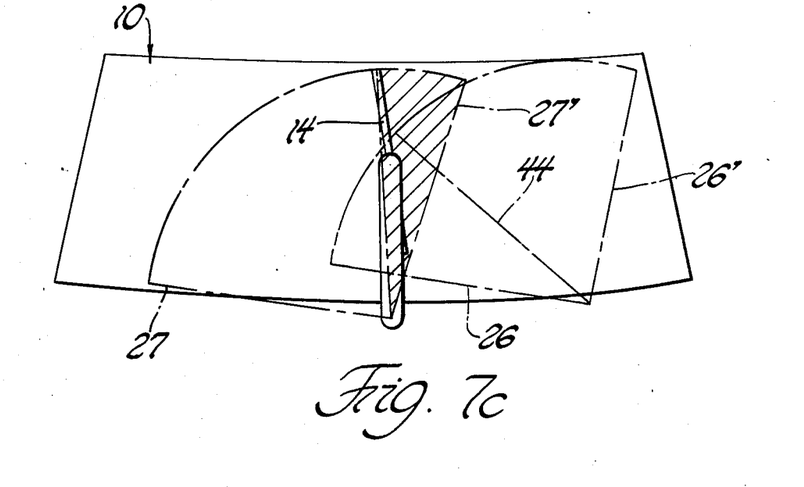

The operation of the system will be described with reference to the flow charts of FIGS. 3-5 and the schematic diagrams of wiper patterns shown in FIGS. 7a-7c. FIG. 3 describes a MAIN computer routine which runs repeatedly while the wiper system is activated. FIG. 4 is an INTERRUPT routine which is run at real time interrupts generated every 700 microseconds, as timed by the timer within computer 30. VELOCITY DRIV (PASS) of FIG. 5 is a subroutine which is part of the INTERRRUPT routine of FIG. 4.

Referring to FIG. 3, the MAIN routine begins a portion which stops one blade to prevent interference with the other by checking the direction of the wipers at 40. This is done by checking a direction flag which has a first value for movement in toward the innerwipe position and another vaue for movement out toward the outerwipe position. Although a flag may be used for each wiper blade, a single flag is used in this embodiment for simplicity since, as will be apparent at a later point in this description, the wiper blades do not move in opposite directions at any time.

If the direction is out, the system next checks at 41 to see if DRIV blade 11, which is the leading blade during outward movement, is in the zone of possible blade interference. This is the area on window 10 of FIG. 1 to the left of line 28, in which there is a possibility of blade interference. It is also seen as a cross-hatched area in the wipe pattern of blade 11 in FIG. 7b. A byte representing the angular position of DRIV blade 11 indicated by line 28 is stored in memory for comparison. If the answer is yes, the system next checks at 42 to see if PASS blade 14 is in the zone of possible blade interference, which is the cross-hatched area in the wipe pattern of blade 14 to the right of line 29 in FIG. 7b. A byte representing the angular position of PASS blade 14 indicated by line 29 is stored in memory for this comparison.

If the answer is once again yes, the allowable range of PASS blade 14 for the precise position of DRIV blade 11 is looked up in memory at 46 and compared at 47 to the actual position of PASS blade 14. There is a single byte representing the limit of such an allowable range for each position of DRIV blade 14 within the zone of possible blade interference stored in memory. An example for a particular position of DRIV blade 11 defined by a line 44 is shown in FIG. 7c. The cross-hatched area of the wipe pattern of blade 14 is this Figure is the area of actual blade interference into which PASS blade 14 should not proceed with DRIV blade 11 in the position of line 44. Therefore, the angular position representing the position of PASS blade 14 is stored for the position of DRIV blade 11 in memory for comparison. If PASS blade 14 has reached this limit, a PASS stop flag is set at 48 for PASS blade 14.

A similar routine is provided for inward movement of the blades starting at 40 and proceeding at 50 to determine if PASS blade 14 is in the zone of possible interference. If it is, DRIV blade 11 is checked at 51 for presence in the zone of possible interference. If it is, the allowable DRIV blade range is looked up in memory at 52 and compared to the actual position at 53. If DRIV blade 11 has reached the limit, the DRIV stop flag is set at 54. This completes the portion of the program which prevents blade interference if one of the blades is far out of synchronization or stopped.

The next portion of the program reverses direction of the blades when they are synchronized at innerwipe positions 26, 27 or outerwipe positions 26', 27'. From either of steps 48 or 54 or from any of the previously described decision points if the answer is not as indicated above, the program proceeds to check at 55 to see if both blades are at their innerwipe positions. If so, the direction flag is set at 56 to outward movement. If not, the routine checks at 57 to see if both blades are at their outerwipe positions. If so, the direction flag is set at 58 for inward movement. From either of steps 56 and 58 the routine proceeds to set pointers to the zones of blade interference for movement in the new direction at 59 before returning to its beginning. The routine returns directly to its beginning from decision point 57 if both blades are not at their outerwipe positions. This completes the portion of the routine which reverses the direction of the blades when they are synchronized at the innerwipe or outerwipe positions.

The INTERRUPT routine, shown in FIG. 4, is performed whenever a real time interrupt is initiated by computer 30. It begins at 60 by reading the digitally converted position values of each of position sensors 24, 25 and beginning the analog to digital conversion process for the next readings, which process is performed by computer 30 independently of program control. In addition all timers are updated. The routine then determines at 61 in which direction the blades are moving. The routine determines at 62, if movement is in, if DRIV blade 11 has reached its innerwipe position and determines at 63, if movement is out, if DRIV blade 11 has reached its outerwipe position. If the answer to either is yes, the DRIV stop flag is set at 64. From step 64, or from either 62 or 63 if the answer is no, the routine proceeds to determine at 65 if direction is in or out. The routine determines at 66, if movement is in, if PASS blade 14 has reached its innerwipe position and determines at 67, if movement is out, if PASS blade 14 has reached its outerwipe position. If the answer to either is yes, the PASS stop flag is set at 68. This completes the part of the routine which stops each blade separately at its outerwipe and innerwipe positions for blade synchronization.

From step 68, or from either 66 or 67 if the answer is no, the routine checks a velocity update timer at 80 to see if it is time to update the velocity. The system closes the loop on velocity to control the movement of the wiper blades, in view of the highly variable drag of the window in different operating conditions. This aids in smoothing apparent blade movement, not only by reducing the amount of desynchronization in each half cycle of blade movement, but by allowing programmed blade velocity across the window. The wipe pattern of each blade is divided, as seen in FIG. 7a, into three regions: a central region of constant velocity flanked by end regions of acceleration and deceleration. The regions for DRIV blade 11 are defined by lines 70, 71 of FIG. 7a; and the regions for PASS blade 14 are defined by lines 72, 73. The cross-hatched areas are the acceleration and deceleration regions for each blade, with acceleration and deceleration being determined by the direction of blade movement. Generally, each blade begins from a standing start at one of its outerwipe or innerwipe positions, accelerates smoothly to a command velocity in the acceleration region, moves with the command velocity through the constant velocity region, decelerates to a minimum velocity in the deceleration region and proceeds at the minimum velocity until the other of the outerwipe and innerwipe positions. The velocity is computed every twentieth interrupt or 14 milliseconds from the present and past positions of each blade and compared to a desired velocity for the position of each blade to adjust the power pulses to the motors for closed loop velocity regulation.

The velocity update is performed in the subroutines entitled VELOCITY DRIV and VELOCITY PASS, which are numbered 81, 82 respectively. These subroutines are essentially identical except that one is for DRIV blade 11 and the other is for PASS blade 14. The subroutine VELOCITY DRIV is shown in FIG. 5. If the stop flag for the blade is found to be set at 83, the subroutine is skipped. However, if it is not, the direction of blade movement is determined at 84. If in, presence in the acceleration region is checked at 85. If it is the acceleration region, an acceleration flag is set at 86. If it is not, presence in the deceleration region is checked at 87. If so, a deceleration flag is set at 88. A similar arrangement is provided for movement in the out direction, with determination of acceleration region at 89, setting of the acceleration flag at 90, determination of the deceleration region at 91 and setting of the deceleration flag at 92. If neither the acceleration nor the deceleration flag is set, the constant velocity region is assumed.

Regardless of which flag is set, the subroutine next proceeds to calculate a command pulse width at 93 for output to DRIV drive 18. The velocity of each blade is computed by subtracting the previous position signal for the blade stored temporarily in memory from the present position signal and then scaling the result. The pulse widths and the velocities are scaled relative to each other so that they can be directly added and subtracted to limit the change of velocity in the acceleration and deceleration regions to a maximum of about 10 percent per velocity adjustment. The actual calculation is performed by taking the previous pulse width, adding the desired velocity and subtracting the actual velocity. The desired velocity depends on the region: the command velocity for the acceleration and constant velocity regions and the minimum velocity for the deceleration region.

The final step in the calculation is comparison with predetermined minimum and maximum values with replacement by the minimum value if the calculated value is less or by the maximum value if the calculated value is greater. The minimum value is important since, without it, the blade would decelerate to a stop in the deceleration region without ever reaching the innerwipe or outerwipe position. The maximum value is important to prevent blade velocity from overshooting the command velocity within the acceleration region before reaching the constant velocity region.

Referring back to FIG. 4, when the output command pulse for DRIV drive 18 has been computed in subroutine 81, a similar command pulse for PASS drive 21 is computed in similar subroutine 82; and the command pulses are then output at 94 on lines PB0-PB7 to down counters 32 and on lines PC0-PC7 to down counter 33. The outputs on lines PA3-PA6 are controlled by the STOP and direction flags for each motor. For example, a STOP flag set for DRIV motor 17 causes high outputs on lines PA3—PA4 to produce high outputs at W1, X1. In addition, the maximum pulse width is output on lines PB0—PB7, rather than that calculated in step 93, for maximum dynamic braking. However, with the STOP flag reset, the direction flag causes one of lines PA3, PA4 to go low so that only W1 or X1 is sent high when down counter 32 is triggered for a time determined by the number determined in step 93 and stored therein. Thus signals are sent to DRIV drive 18 to pulse width modulate the power to motor 17 and thus control its velocity or to dynamically brake motor 17 to an immediate stop.

In this embodiment, as previously described, the trailing blade is stopped short of collision with the leading blade if such collision is found to be imminent. Although this is sufficient for purposes of this description, it should be clear that other action may be programmed to follow. For example, the trailing blade or both blades could be reversed to return to the last innerwipe or outerwipe position, with another attempt at normal operation after a suitable delay period. Alternatively, the trailing blade may continue its wipe cycle through a shortened arc determined by the allowable positions for the position of the leading blade. Other possibilities will be apparent to those skilled in the art in view of this disclosure.

FIG. 6 illustrates a motor control circuit for use in the control system described above. The circuit corresponds to DRIV drive 18 and controls DRIV motor 17; a similar circuit corresponds to PASS drive 21. The circuit has two inputs (W1, X1) and is capable of producing motor actuation in either direction, stopping motor actuation or dynamically braking the motor, depending on the combination of the two inputs.

Referring to FIG. 6, DRIV motor 17 is connected across two bridge terminals 100, 101 of a bridge circuit with a power supply symbolized by battery 102 (B+, ground) and a series resistor 103 connected across the other bridge terminals 104, 105. PNP transistors 106, 107 have emitters connected to terminal 104 and collectors connected, respectively, to terminals 100, 101. NPN transistors 108, 109 have emitters connected to terminal 105 and collectors connected, respectively, to terminals 100, 101. Transistors 106—109 have freewheeling diodes 111—114, respectively, connected across emitter to collector in the usual manner. The bases of transistors 106, 107 are connected to battery 102 (B+) through resistors 115, 116, respectively, and through resistors 117, 118, respectively, to the collectors of NPN transistors 120, 121, respectively. Transistor 120 has an emitter connected to the base of transistor 109 and through a resistor 122 to terminal 105. Likewise, transistor 121 has an emitter connected to the base of transistor 108 and through a resistor 123 to terminal 105. Thus transistor 120 may be actuated to cause conduction in transistors 106, 109 for actuation of motor 17 in one direction; and transistor 121 may be actuated to cause conduction of transistors 107, 108 for actuation of motor 17 in the opposite direction.

For the actuation of transistor 120, the input terminal marked W1 is connected through a resistor 125 to the base of an NPN transistor 126 having an emitter grounded in a manner to be later described and a collector connected through a resistor 127 to battery 102 (B+) and also connected to the base of an NPN transistor 128. Transistor 128 has a grounded emitter and a collector connected through a resistor 129 to battery 102 (B+) and also connected to the base of transistor 120. Thus a high voltage on input W1 turns transistor 126 on, transistor 128 off and transistor 120 on to actuate motor 17 in one direction. On the opposite side, the input terminal marked X1 is connected through a resistor 130 to the base of an NPN transistor 131 having an emitter grounded in a manner to be later described and a collector connected through a resistor 132 to battery 102 (B+) and also connected to the base of an NPN transistor 133. Transistor 133 has a grounded emitter and a collector connected through a resistor 134 to battery 102 (B+) and also connected to the base of transistor 121. Thus a high voltage on input X1 turns transistor 131 on, transistor 133 off and transistor 121 on to actuate motor 17 in the opposite direction. If the voltages at inputs W1 and X1 are both low, transistors 120, 121 are turned off to turn off transistors 106-109 and open the armature circuit of motor 17.

In order to provide the dynamic braking mode of operation for motor 17, NPN transistors 135, 136 are provided. Transistor 135 has a base connected through a resistor 137 to terminal W1, a grounded emitter and a collector connected to the base of transistor 108 to shunt base drive from transistor 108 whenever a high voltage appears at terminal W1. Likewise, transistor 136 has a base connected through a resistor 138 to terminal X1, a grounded emitter and a collector connected to the base of transistor 109 to shunt base current from transistor 109 when a high voltage appears at terminal X1. If only one of terminals W1, X1 is given a high voltage, the one of transistors 108, 109 not in the actuated motor armature circuit is held off. However, if both terminals W1, X1 are given a high voltage, both transistors 108, 109 are held off while both transistors 106, 107 are actuated to remove battery 102 from the armature circuit of motor 17 but establish dynamic braking paths through transistor 106 and diode 112 and through transistor 107 and diode 111. The path which is effective depends on the direction of rotation of the armature of motor 17.

Overcurrent protection is provided for the circuit of FIG. 6. Terminal 105 is connected through a resistor 140 to the non-inverting input of a comparator 141 having a positive feedback resistor 142 and a negative feedback capacitor 143. The inverting input of comparator 141 is connected to the junction 144 of a voltage divider comprising resistors 145, 146 connected from Vcc to ground. The output of comparator 141 is connected through a resistor 170 to Vcc and also directly to the emitters of transistors 126, 131. Thus the current path to ground from these emitters is through the output transistor of comparator 141, when the voltage at the inverting input exceeds that at the non-inverting input. The armature current of motor 17 flows through resistor 103 and generates a voltage at the non-inverting input of comparator 141 proportional to the current level. This voltage is compared to a fixed reference voltage from junction 144 to open the emitter circuits of transistors 126, 131 and thus open the armature circuit of motor 17 if the armature current of motor 17 increases beyond a predetermined limit.

Thermal protection is also provided for the circuit of FIG. 6. A comparator 150 has a positive feedback resistor 151, a negative feedback capacitor 152, a non-inverting input provided with a fixed voltage from junction 153 of a voltage divider comprising resistors 154, 155 connected from Vcc to ground and an inverting input provided with a voltage varying with temperature from junction 156 of a voltage divider comprising resistor 157 and diode 158 connected from Vcc to ground. The output of comparator 150 is connected to Vcc through a resistor 159 and also through a diode 160 to the non-inverting input of comparator 141. Diode 158 provides a temperature dependent voltage at junction 156, which is compared to a fixed reference voltage from junction 153. If the temperature is lower than a predetermined limit, the output of comparator 150 is held low so that it does not affect the voltage at the non-inverting input of comparator 141. However, if the temperature exceeds that limit, the output of comparator 150 allows battery voltage to generate a current through resistor 159, diode 160 and resistors 140, 103 in series to provide a voltage at the non-inverting input of comparator 141 sufficiently high to cause opening of the armature circuit of motor 17 as described in the last paragraph.

The power supply for the circuit of FIG. 6 includes a terminal connected to battery 102 (B+) and through a resistor 172 to a terminal labelled Vcc. The Vcc terminal is also connected to ground through a 7.5 volt zener diode 173 and a capacitor 174 in parallel. For protection of the circuit of FIG. 6, a 28 volt zener diode 162 is connected across the bases of transistors 106, 108 to turn on both transistors and provide a current path to ground in case of overvoltage on the power line such as that produced by the operation of a motor vehicle alternator with the battery disconnected. In addition, capacitors 164, 165 may be provided to ground from inputs W1, X1, respectively, and capacitor 175 from battery 102 (B+) to ground to shunt spurious voltage spikes.

Sample values for selected circuit components in the circuit of FIG. 6 are as follows:

Resistors

103—0.01 ohm
117, 118—27 ohm, high power
115, 116, 122, 123, 137, 138, 140—100 ohm
129, 134, 172—510 ohm
159—2K
127, 132—4.7K
170—5K
125, 130—10K
146—1.2K, 1%
155—1.37K, 1%
142—5K, 1%
145, 154, 157—30K, 1%
151—33K, 1%

Capacitors 143, 152—2.2 pf
164, 165—0.01 microf
174, 175—0.1 microf

The embodiments of the invention in which an exclusive property or priviledge is claimed as defined as follows:

1. A control for a vehicle window wiper system having a pair of reversible electric motors effective to drive wiper blades through repeating, synchronized overlapping patterns across a vehicle window, the control comprising, in combination:

a position sensor for each wiper blade effective to generate a signal representing the angular position of the blade;

memory means defining, for each pattern, inner and outer wipe positions with acceleration, constant velocity and deceleration regions therebetween and further defining a command velocity for the constant velocity regions, the memory means further defining a zone of potential blade interference and, for each position of each blade within this zone, a non-interference zone for the other blade;

velocity control means responsive to the signals from the position sensors and effective to derive the velocities of the blades therefrom and the command velocity from the memory means and deliver electric power to the motors in closed loop control so as to maintain the command velocity in the constant velocity region, accelerate to the command velocity in the acceleration region and decelerate from the command velocity in the deceleration region;

synchronization means effective to synchronize the wiper blades at each of the inner and outer wipe positions by stopping each blade as it reaches each of the inner and outer wipe positions and starting both together in the reverse direction; and means responsive to signals from the position sensors indicating that both of the blades are within the zone of potential blade interference to derive from the memory means, for the position of the blade in advance in the direction of common blade movement, the non-interference zone for the other blade and prevent the other blade from leaving this zone, whereby wiper operation is coordinated with controlled velocity, synchronized wipes and prevention of blade interference.

2. A control for a vehicle window wiper system having a pair of reversible electric motors effective to drive wiper blades through repeating, synchronized overlapping patterns across a vehicle window, the control comprising, in combination:

a position sensor for each wiper blade effective to generate a signal representing the angular position of the blade;

memory means defining, for each pattern, inner and outer wipe positions with acceleration, constant velocity and deceleration regions therebetween and further defining a command velocity for the constant velocity regions, the memory means further defining, for each wiper blade, a zone of potential blade interference and, for each position of each blade within its respective zone of potential interference, a stop number defining a non-interference zone for the other blade;

velocity control means responsive to the signals from the position sensors and effective to derive the velocities of the blades therefrom and the command velocity from the memory means and deliver electric power to the motors in closed loop control so as to maintain the command velocity in the constant velocity region, accelerate to the command velocity in the acceleration region and decelerate from the command velocity in the deceleration region;

synchronization means effective to synchronize the wiper blades at each of the inner and outer wipe positions by stopping each blade as it reaches each of the inner and outer wipe positions and starting both together in the reverse direction; and means responsive to signals from the position sensors indicating that both of the blades are within their respective zones of potential interference to derive from the memory means, for the position of the blade in advance in the direction of common blade movement, the stop number indicating the non-interference zone for the other blade and stop the other blade when the signal from the position sensor for the other blade corresponds to the stop number, whereby wiper operation is coordinated with controlled velocity, synchronized wipes and prevention of blade interference.

3. A control for a vehicle window wiper system having a pair of reversible electric motors effective to drive wiper blades through repeating, synchronized overlapping patterns across a vehicle window, the control comprising, in combination:

a position sensor for each wiper blade effective to generate a signal representing the angular position of the blade;

memory means effective to store numbers defining, for each pattern, inner and outer wipe positions and boundaries for central constant velocity regions flanked by acceleration and deceleration regions and further effective to store a number representing a command velocity for the constant velocity regions and a·minimum velocity, the memory means further being effective to store a number for each wiper blade defining a zone of potential blade interference and to store, for each position of each blade within its respective zone of potential interference, a stop number defining a non-interference zone for the other blade;

velocity control means responsive to the signals from the position sensors and effective to derive the velocities of the blades from successive position signals and further responsive to said derived velocities and the command velocity to deliver output electric power pulses to the motors in closed loop control so as to maintain the command velocity in the constant velocity region, accelerate to the command velocity in the acceleration region and decelerate to the minimum velocity in the deceleration region;

synchronization means effective to synchronize the wiper blades at each of the inner and outer wipe positions by stopping each blade as it reaches each of the inner and outer wiper positions and starting both together in the reverse direction; and means responsive to signals from the position sensors indicating that both of the blades are within their respective zones of potential interference to derive from the memory means, for the position of the blade in advance in the direction of common blade movement, the stop number indicating the non-interference zone for the other blade and stop the other blade when the signal from the position sensor for the other blade corresponds to the stop number, whereby wiper operation is coordinated with controlled velocity, synchronized wipes and prevention of blade interference.

* * * * *